US007249208B2

(12) United States Patent
Aslot et al.

(10) Patent No.: US 7,249,208 B2
(45) Date of Patent: Jul. 24, 2007

(54) SYSTEM AND METHOD FOR EXTENDING THE CROSS-MEMORY DESCRIPTOR TO DESCRIBE ANOTHER PARTITION'S MEMORY

(75) Inventors: Vishal Chittranjan Aslot, Austin, TX (US); Bruce G. Mealey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 10/855,726

(22) Filed: May 27, 2004

(65) Prior Publication Data

US 2005/0268047 A1    Dec. 1, 2005

(51) Int. Cl.
*G06F 17/50* (2006.01)
*G06F 9/46* (2006.01)
*H04L 12/66* (2006.01)
*H04J 3/16* (2006.01)

(52) U.S. Cl. .................. 710/104; 709/232; 709/223; 710/5; 710/52; 370/466; 370/463; 718/100; 716/2

(58) Field of Classification Search ................ 719/328; 716/2; 713/193; 711/153, 206; 709/232, 709/223; 710/5, 52
See application file for complete search history.

(56) References Cited

U.S. PATENT DOCUMENTS

| | | | |
|---|---|---|---|
| 5,590,313 A * | 12/1996 | Reynolds et al. .............. 703/26 |
| 5,931,925 A * | 8/1999 | McNabb et al. ............... 710/52 |
| 6,381,682 B2 * | 4/2002 | Noel et al. .................. 711/153 |
| 6,725,284 B2 * | 4/2004 | Arndt ............................ 710/5 |
| 6,751,783 B1 * | 6/2004 | Eneboe et al. ................. 716/2 |
| 6,904,599 B1 * | 6/2005 | Cabrera et al. ............. 719/328 |
| 6,981,051 B2 * | 12/2005 | Eydelman et al. .......... 709/232 |
| 7,085,827 B2 * | 8/2006 | Ishizaki et al. ............. 709/223 |
| 7,088,735 B1 * | 8/2006 | Reohr et al. ................ 370/466 |
| 2002/0071450 A1* | 6/2002 | Gasbarro et al. ........... 370/463 |
| 2003/0204648 A1* | 10/2003 | Arndt ............................ 710/5 |
| 2004/0167996 A1* | 8/2004 | Takamura et al. ............. 710/5 |
| 2004/0177261 A1* | 9/2004 | Watt et al. .................. 713/193 |
| 2005/0210470 A1* | 9/2005 | Chung et al. ............... 718/100 |
| 2006/0053267 A1* | 3/2006 | McDonald et al. ......... 711/206 |
| 2006/0080514 A1* | 4/2006 | Newport ..................... 711/153 |

OTHER PUBLICATIONS

Flansburg, "Technote: Fundamentals of Open Firmware, Part II: The Device Tree", Technote 1062, Release 1.0, 1996 Apple Computer, Inc., Sep. 6, 1996, pp. 1-13.

* cited by examiner

*Primary Examiner*—Mark H. Rinehart
*Assistant Examiner*—Brian Misiura
(74) *Attorney, Agent, or Firm*—Duke W. Yee; Casimer K. Salys; James O. Skarsten (57) ABSTRACT

A system and method for extending the use of the cross-memory descriptor in a server partition environment such that it may be used to describe another partition's memory, e.g., a client partition's memory (referred to hereafter as a "remote" memory), are provided. With the system and method, when an operating system in a logically partitioned computing system is initialized, operating system kernel services are invoked that examine a device tree of the computing system and generate an extended cross-memory descriptor that describes the local memory of another logical partition, which is a remote memory to the present logical partition. When an access to a remote memory is required to perform an operation, the operating system of the server partition uses the stored extended cross-memory descriptor to perform the remote memory access.

17 Claims, 5 Drawing Sheets

SYSTEM AND METHOD FOR EXTENDING THE CROSS-MEMORY DESCRIPTOR TO DESCRIBE ANOTHER PARTITION'S MEMORY

BACKGROUND OF THE INVENTION

1. Technical Field

The present invention is generally directed to an improved data processing system. More specifically, the present invention is directed to a system and method for extending the cross-memory descriptor so that it may be used to describe memory from another partition in a logically partitioned computing environment.

2. Description of Related Art

The Advanced Interactive Executive (AIX) operating system supports logical partitioning (LPAR) in International Business Machine (IBM) Corporation's pSeries machines. LPARs allow the running of multiple system images on a single processor complex. Each such image has a full complement of CPUs (dedicated or shared), central storage, expanded storage and channels. With LPAR, there is a clear isolation of resources between partitions such that one partition may not make the system environment of any other partition unstable. In IBM Corporation's machines, the facility that enables this clear separation of resources for partitions is the hypervisor.

Since each partition has its own isolated set of resources, each partition has its own "local" memory that is hidden from surrounding partitions. Until the creation of virtual input/output (VIO) there was no legitimate reason for one partition to access another partition's memory directly.

With VIO a concept of point-to-point Direct Memory Access (DMA) operations and memory copy operations between partitions was introduced. DMA operations permit transfers of data from one memory to another memory directly without using the central processing unit (CPU) to perform the data transfers. DMA operations permit faster data transfers than if the CPU had to be used to transfer the data. Memory copy operations permit portions of memory to be directly copied from one memory to another.

Thus, VIO allows sharing of physical resources, e.g., an I/O adapter, etc., between partitions. Since a resource can belong to only one partition (called a "server" partition), the other partitions have to go through the server partition in order to use the resource (the other partitions are referred to as "client" partitions).

In the case of the shared resource being an I/O adapter, in order to use a server partition's I/O adapter, the server partition needs to setup a DMA operation from the I/O adapter to the client's memory. However, in order to setup the DMA operation, the server partition needs to know information about the structure of the client partition's memory. Moreover, the server partition needs to be able to pass the information about the client partition's memory structure down its own I/O stack, i.e. the prescribed hierarchy of software layers through which a data must be processed in order to perform an I/O operation (e.g., Logical Volume Manager (LVM), head driver, adapter drivers, bus drivers, kernel, and so on), in a useable format. Thus, it would be beneficial to have a system and method for describing a client partition's memory in a server partition's environment in such a manner that the description may be easily passed down the server partition's I/O stack.

SUMMARY OF THE INVENTION

The present invention provides a system and method for extending the use of the cross-memory descriptor in a server partition environment such that it may be used to describe another partition's memory, e.g., a client partition's memory (referred to hereafter as a "remote" memory). With the system and method, when an operating system in a logically partitioned computing system is initialized, such as during boot-up of the logical partition, operating system kernel services are invoked for performing boot-up operations, such as the loading of device drivers and the like. As part of these operating system kernel services, a kernel service is invoked that attaches remote memories of other logical partitions to the present operating system so that remote memory copy and DMA operations may be performed with the remote memories of the other logical partitions.

The attach kernel service examines a device tree of the computing system which may be created by Open Firmware or the like and be maintained in memory of the server partition such that it is accessible to the Operating System in the server partition. There is one device tree instance per logical partition. The device tree includes nodes for resources in that partition. These resources include local memories for each partition, PCI/ISA I/O slots, processors, supported firmware calls, and so on.

When the VIO is supported in the computing environment, in a typical embodiment, the /vdevice node or its children nodes in the device tree of the server partition contains the descriptions of the local memories of the client partitions. The description includes a logical identifier of the client's local memory, a starting address of the local memory, and a length of the local memory. From this information, an extended cross-memory descriptor for each local memory of each logical partition may be generated. These extended cross-memory descriptors are then maintained by the operating system of the current partition for use in performing remote memory copy and DMA operations.

When an access to a remote memory is required to perform an operation, the operating system of the server partition uses the extended cross-memory descriptor that describes the "remote" memory of the client partition that is the subject of the remote memory operation. The extended cross-memory descriptor of the present invention is an extension of existing cross-memory descriptors which are data structures typically used to describe only a local memory of a partition in which the cross-memory descriptor is used.

The fields of the cross-memory descriptor, in the present invention, are extended such that they are utilized to store information about the local memory of another partition, i.e. a "remote" memory. In particular, the fields of the extended cross-memory descriptor include an address space identifier, a size of the remote memory, an identifier to identify which remote memory (in the case where there are several client partitions), and a starting address within the remote memory. The address space identifier, when the cross-memory descriptor is used to represent a "remote" memory, identifies the cross-memory descriptor as a remote memory description. Thus, any interface in the I/O stack or the memory management services that examines the cross-memory descriptor can now look at the address space identifier and recognize that this is a remote memory description. As a result, the interface can take appropriate actions for setting up a DMA operation to access the "remote" memory.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides a mechanism for extending a cross-memory descriptor in a first partition environment so that it describes a local memory of another partition in order to facilitate operations requiring direct memory access or remote memory copy operations. Thus, the present invention is preferably implemented in a computing device in which resources are partitioned using a logical partitioning mechanism.

Figure 1:
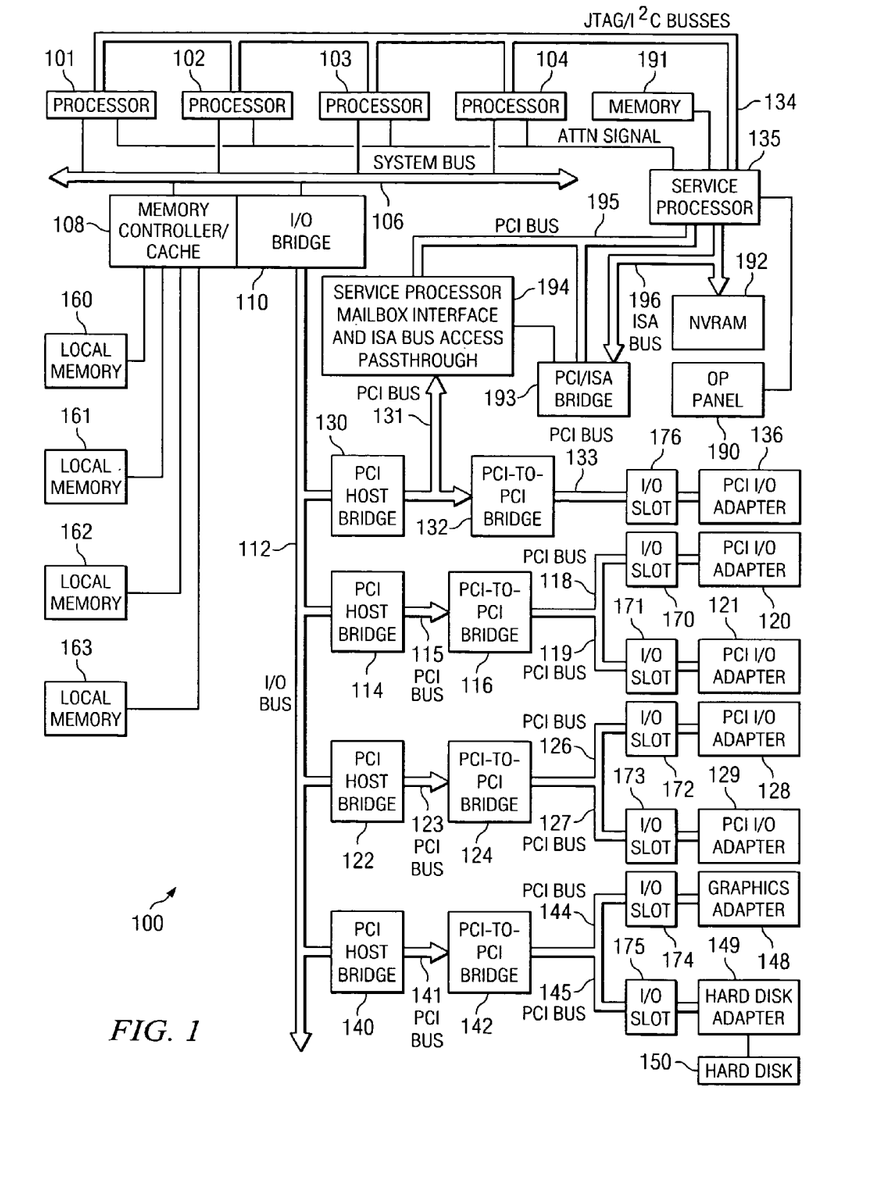
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
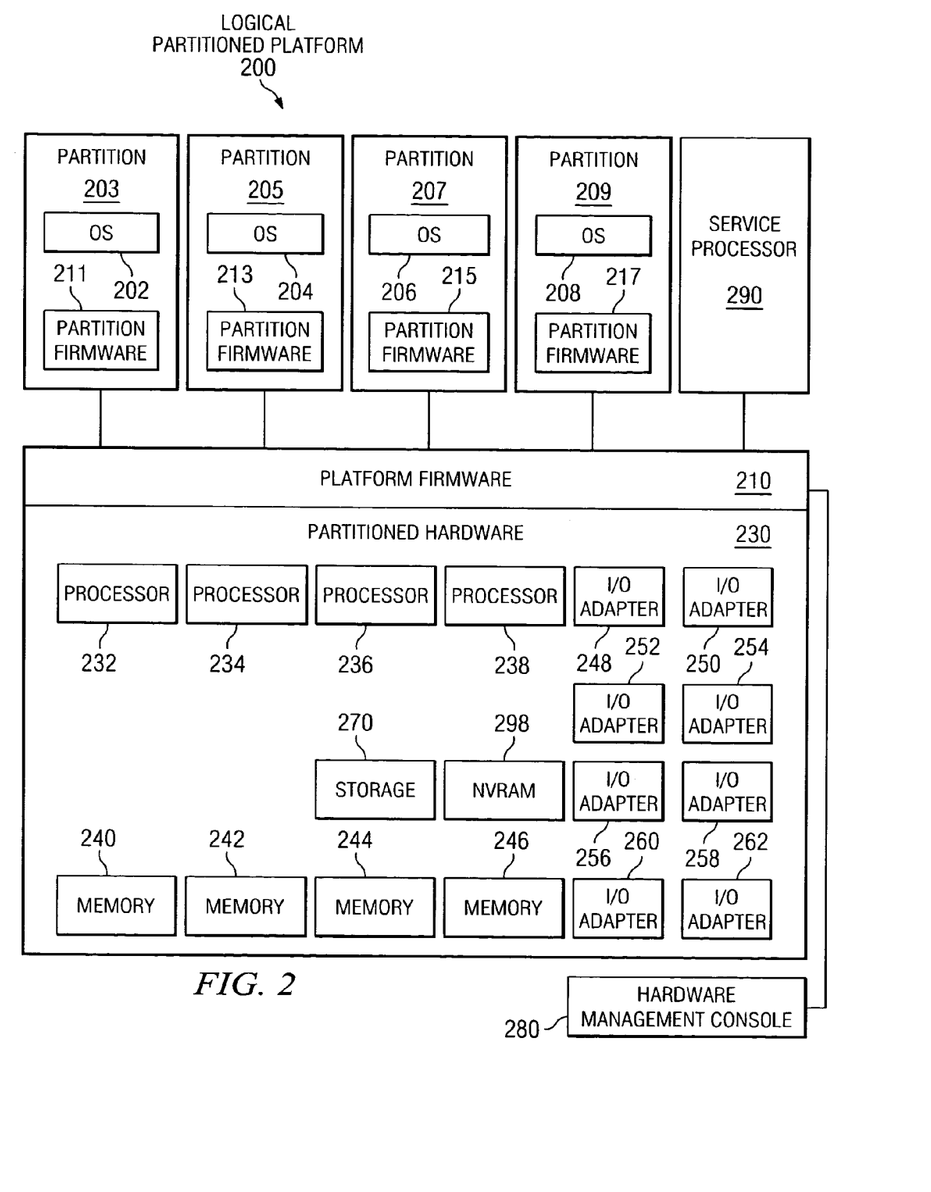
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as a hypervisor. OS/400 is used only as an example in these illustrative embodiments. Of course, other types of operating systems, such as AIX and linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

In such a logically partitioned environment, whenever data is to be moved between the kernel and an address space other than the current process address space, a cross-memory kernel service is utilized to perform this moving of data. A data area within one region of an address space is attached by calling the xmattach kernel service which attaches to a user buffer for cross-memory operations. When the xmattach kernel service is invoked, the xmattach kernel service generates a cross-memory descriptor. Thereafter, other cross-memory kernel services may be utilized to move or copy the data from the kernel to an address space other than the current process address. For example, the xmemin kernel service performs a cross-memory move by copying data from the specified address space to kernel global memory. The xmemout kernel service performs a cross-memory move by copying data from kernel global memory to a specified address space. The xmemdma kernel service prepares a page of memory for DMA I/O or processes a page after DMA I/O is complete.

In known computing systems, the cross-memory descriptor is a data structure used to describe local memory. The local memory cross-memory descriptor is generated from the information maintained by the Virtual Memory Management (VMM) component of the Operating System.

An extended cross-memory descriptor according to the present invention is generated by kernel services based on a device tree that is generated and parsed by the operating system at boot timer. The device tree is similar to the Open Firmware Device Tree which is a hierarchical data structure that describes the system hardware and user configuration choices. The Open Firmware Device Tree also contains hardware drivers and support routines for use by these drivers. The following is an example of an Open Firmware Device Tree:

```
root      /
ff8885f8  /rtas
ff866bf4  /rom@ff000000
ff8627c0  /flash@fff00000
ff8513d0  /cpus
ff88a1c8     /PowerPC,604ev@0
ff88a788        /12-cache
ff84d8e0  /pci
ff89552c     /ethernet@4
ff8952e0     /display
ff88cf44     /mac-io@2
ff893e68        /misc@0
ff894688           /iic
ff893d7c        /via@16000
ff8939fc        /escc@13000
ff893c2c           /ch-b@13000
ff893af4           /ch-a@13020
ff88fd08        /scsi@10000
ff892e1c           /tape
```

```
-continued ff8924d0           /disk
ff88f944        /escc-legacy@12000
ff88fba8           /ch-b@12000
ff88fa60           /ch-a@12002
ff88d78c        /adb@11000
ff88f364           /mouse@3
ff88e6dc           /keyboard@2
ff88d638        /open-pic@40000
ff88aad8     /ide@1,1
ff88c504        /disk
ff85a534     /isa@1
ff864208        /sound@i534
ff8640e8        /midi@i330
ff863ff8        /game@i200
ff863368        /gpio@i800
ff863008        /nvram@me0000
ff862aa4        /rtc@i70
ff85f644        /8042@i60
ff8618b0           /mouse@aux
ff860260           /keyboard@
ff85d804        /floppy@i3f0
ff85d3b4        /parallel@i3bc
ff85c704        /serial@i2f8
ff85b9f4        /serial@i3f8
ff85b490        /timer@i40
ff85b01c        /interrupt-controller@i20
ff85ae08        /dma-controller@i00
ff84a650  /mmu
ff83f2e4  /memory@0
```

With the present invention, a similar device tree representation is used to obtain information for generating the extended cross-memory descriptor. The device tree is object oriented such that each of the entries in the device tree have associated properties that may be examined. An example of a node, in the device tree, where information about remote memories may be presented to the operating system, is illustrated as follows:

```
/devicenode
    ...
    remote-memory-info  10000000 00200000 00040000
                        20000000 003D0000 00020000
                        ...
    ...
``` where the "remote-memory-info" is a property of the node "/devicenode." In a typical implementation of a clinet-server virtual I/O model, the node "/devicenode" would represent the server device's node. As discussed hereafter, this node may be parsed and information obtained from parsing this node may be used to generate an extended cross-memory descriptor in accordance with the present invention. Thus, the "10000000" entry is the logical identifier of the memory, the "00200000" entry is the starting address of the memory, and the "00040000" entry is the size of the memory in bytes, for a first client. Likewise, "20000000" is the logical identifier of the memory, "03D00000" is the starting address within the memory, and "00020000" is the size of the memory in bytes, for a second client. This triplet (logical-id, starting address, size) may be repeated for each client that the server serves.

From this device tree information, a detailed description of the system hardware and user configuration choices may be obtained. In particular, as shown above, memory nodes of the device tree include properties designating a logical identifier of the memory, the starting address of the memory and the length of the memory. This information may be used by the kernel services to generate a cross-memory descriptor for the local memory resources of the computing system.

The cross-memory descriptor is used as a way to access memory from two unrelated contexts such that no knowledge of the owner of the memory-in-question is required. For example, when an interrupt handler needs to pass data to a process, it uses a cross-memory descriptor to obtain information about the process' memory space to copy the data to the process' memory space. This is necessary because the interrupt handler does not necessarily run in the context of a process whose data it possesses and hence has no idea about which process the data belongs to. All that the interrupt handler knows is a description of memory, i.e. the cross-memory descriptor, where the data should be copied.

Another example of the use of a local memory cross-memory descriptor is disk I/O. For example, a user-level application may call an IOCTL to read information about a disk. The information would be stored in the application supplied buffer, which is in the user-space. When the disk driver is called, the disk driver calls xmattach to attach the application's buffer. All this is done by the top-half of the disk driver.

Some time in the future, when the I/O request completes and data becomes available, the "iodone" routine of the disk driver, which is in the bottom-half of the disk driver, calls xmout to copy the data to the user-space using the cross-memory descriptor. The cross-memory descriptor is stored by the disk driver, such that it is accessible to both top and bottom halves.

The cross-memory descriptor is generated by the kernel services at operating system initialization and is passed from interface to interface (or memory management service) in the I/O stack of the computing device as needed. The interfaces and memory management services of the I/O stack examine the cross-memory descriptor to obtain information necessary for performing cross-memory operations.

Operating systems are faced with a similar issue with respect to the remote memory of another partition because the remote memory copy/DMA operations do not have any knowledge of the owner device in another partition. Thus, the present invention makes use of an extended version of the cross-memory descriptor to provide information about remote memory of another partition when performing a remote memory copy/DMA operation.

The local cross-memory descriptor consists of four major fields: an address space identifier, a number of segments, a starting segment identifier, and a starting address within the segment. The address space identifier provides a unique identifier of the memory to which data is to be copied. The number of segments provides a total number of segments of the address space identified by the address space identifier. The starting segment identifier identifies a segment within the total number of segments at which the data to be copied is to start being written. The starting address within the segment identifies an address within the segment identified by the starting segment identifier, at which the data to be copied is to start being written.

The following is an example of a cross memory data structure in which these major fields are illustrated:

```
enum asid={LOCAL=0, REMOTE=1};
struct cross_memory {
    enum asid address_space_id;   /* LOCAL, REMOTE,
                                     etc. */
    int number_of_segments;   /* number of segments
                                 if address_space_id=LOCAL*/
    long segment_id;          /* segment number if
                                 address_space_id=LOCAL */
    char *vaddr;              /* starting address within
                                 the segment if
                                 address_space_id=LOCAL */
    uint flags;               /* any special attributes
                                 of the segment or address
                                 range */
};
#define remote_size (number_of_segments)   /* size of
                                              remote memory if
                                              address_space_id=REMOTE */
#define remote_logical_id (segment_id)    /* remote
                                             memory's logical
                                             identifier*/
#define remote_start_addr (vaddr)         /* starting
                                             address within the remote
                                             memory */
```

Thus, from the above fields it is clear that the cross-memory descriptor provides a description of the memory with such specificity that it can be used to perform cross-memory operations without any need to know the owner of a particular address space and thus, pass the data to the owner in order to access the address space. The present invention makes use of this known data structure to facilitate a different operation in which information about the ownership of the resource is not required to complete the operation. That is, the present invention uses an extended version of the cross-memory descriptor to facilitate remote memory copy/DMA operations from one partition to another (where the "remote" memory is a memory in a different partition than the partition of the currently executing process). With such operations, processes in one partition may access the memory of another partition as part of a virtual input/output (VIO) process without having to pass the data to a particular process that has ownership of the remote memory. As a result, remote memory copy and DMA operations across partitions are enabled by the use of the extended cross-memory descriptor of the present invention.

With the present invention, the cross-memory descriptor fields are used to store information about a remote memory. The original four fields of the cross-memory descriptor are overloaded to describe the remote memory to thereby generate an extended cross-memory descriptor having the following four fields: address space identifier, size of remote memory, an identifier to identify the remote memory, and a starting address within the remote memory. The address space identifier of the extended cross-memory descriptor is similar to the address space identifier of the original cross-memory descriptor with the exception that a predetermined value may be stored in this field to indicate that the extended cross-memory descriptor corresponds to a remote memory of a client partition.

The size of the remote memory may be designated in bytes or any other unit of memory size and designates the total size of the remote memory with which access is to be performed. The remote memory identifier identifies a particular remote memory in a particular client partition. This is important in the case that there is a plurality of client partitions and it is necessary to designate which remote memory is being accessed. The starting address within the remote memory provides the position within the remote memory designated by the remote memory identifier where access is to start. From these four fields, a complete picture of the remote memory is obtained in order to perform remote memory copy/DMA operations.

The extended cross-memory descriptor may be passed from interface to interface through the I/O stack in the same manner that the original cross-memory descriptor. Those interfaces and memory management services that need to examine the extended cross-memory descriptor are augmented to include code for handling the extended cross-memory descriptor. That is, those interfaces and memory management services are augmented to include code that recognizes when the address space identifier includes a predetermined value identifying the extended cross-memory descriptor as describing a remote memory for a remote memory access request. The interfaces and memory management services may then perform appropriate actions based on the size of the remote memory, the identity of the remote memory, and the starting address in the remote memory provided by the extended cross-memory descriptor. For example, the d_map_page and d_map_list interfaces use the remote cross-memory descriptor to correctly set up DMA from a physical device owned by a server partition to a remote memory. So the remote cross-memory descriptor is passed by the physical device's driver to the d_map_page/list interface to set up the DMA. By definition of the server partition, the physical device belongs to the server partition. As a result, remote memory copy/DMA operations may be performed across partitions.

By overloading the existing cross-memory descriptor to be an extended cross-memory descriptor having essentially the same format as the original cross-memory descriptor but with different data stored in the fields of the cross-memory descriptor and different connotations associated with this different data, the present invention permits many of the interfaces and memory management services that require the cross-memory descriptor but do not examine the contents of the cross-memory descriptor to operate as they have without modification. That is, the extended cross-memory descriptor allows the operating system to maintain binary compatibility with interfaces and memory management services that need the cross-memory descriptor but do not actually examine it. For example, most device drivers need the cross-memory descriptor but do not examine it. They simply pass the cross-memory descriptor down to the kernel or the PCI bus driver. Such device drivers do not need to be recompiled because of changes to the cross-memory descriptor made by the present invention and they may continue to operate as they always have.

Figure 3:
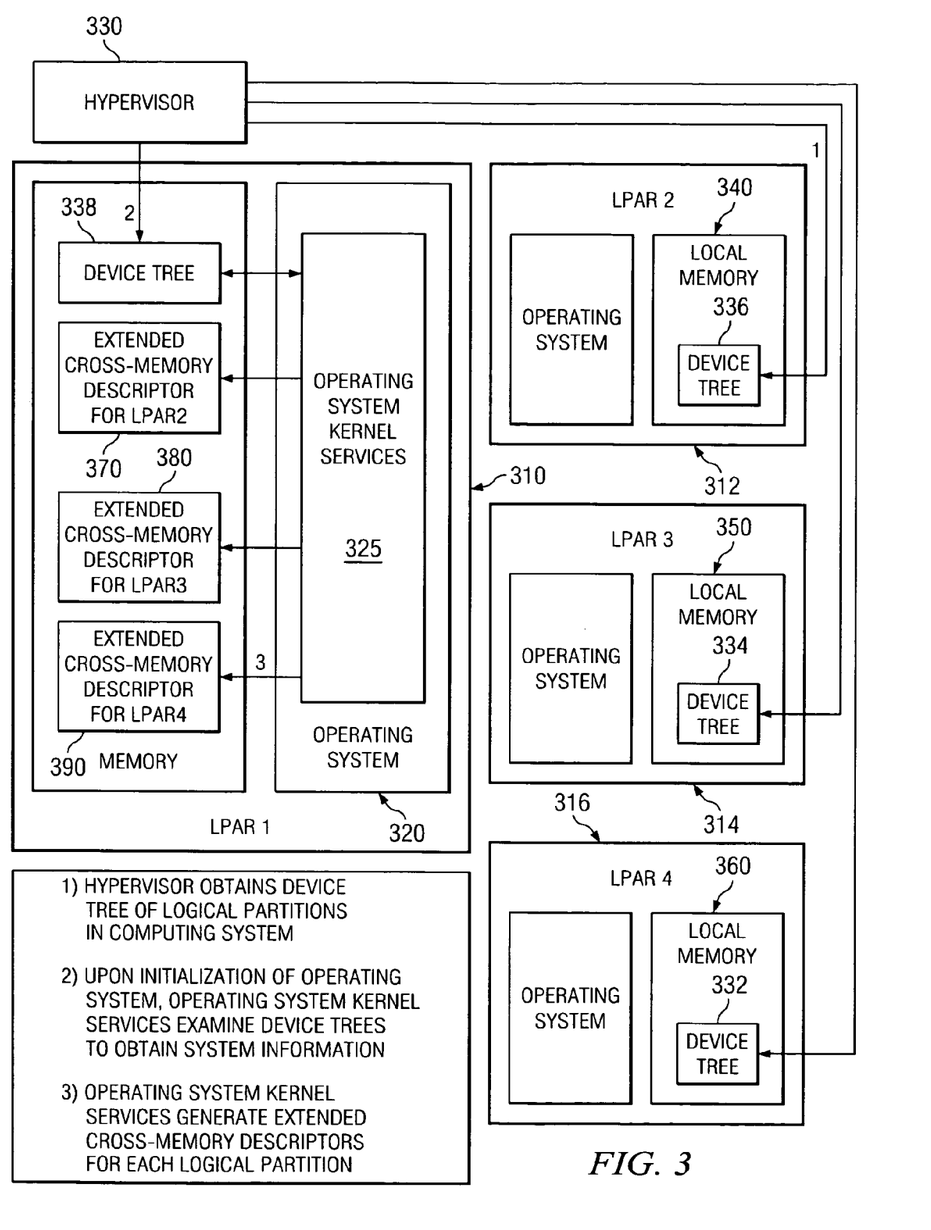
FIG. 3 is an exemplary diagram illustrating an example of a mechanism for generating an extended cross-memory descriptor in accordance with one exemplary embodiment of the present invention.

FIG. 3 is an exemplary diagram illustrating an example of a mechanism for generating an extended cross-memory descriptor in accordance with one exemplary embodiment of the present invention. As shown in FIG. 3, when an operating system 320 of a logical partition 310 in a logically partitioned computing system is initialized, such as during boot-up of the logical partition 310, operating system kernel services 325 are invoked for performing boot-up operations, such as the loading of device drivers and the like. As part of these operating system kernel services 325, a kernel service is invoked that attaches remote memories of other logical partitions 312-316 to the present operating system so that remote memory copy and DMA operations may be performed with the remote memories of the other logical partitions. In one exemplary embodiment of the present invention, the kernel service that attaches remote memories is referred to as xmattach_remio and is an extended version of the known xmattach cross-memory kernel service. The xmattach_remio attaches remote memories for cross-memory operations that may be performed by extended versions of the known xmemout and xmemin cross-memory kernel services and d_map_page and d_map_list kernel services.

The extended attach kernel service examines a device trees 332-338 of the computing system which may be maintained in a hypervisor 330 or the like. The hypervisor 330 is a facility that provides and manages multiple virtual machines in a logically partitioned computing system. An individual device tree 332-338 for each logical partition is maintained in the hypervisor 330. In addition, a copy of the device tree 332-338 for a logical partition may be stored in a local memory of that logical partition such that it is accessible to the operating system kernel of the logical partition. The operating system provides a library of functions that the kernel extensions (e.g., device drivers) and user level code car use in order to parse the device trees 332-338.

The device trees 332-338 include nodes for each partition of the computing system and their resources. These resources include local memories 340-360 for each partition. The nodes of the device trees 332-338 that represent these local memories of the partitions include properties of the local memories including a logical identifier of the local memory, a starting address of the local memory and a length of the local memory. From this information, the size of the local memory for each logical partition (which are "remote" memories with respect to the current logical partition), an identity of the local memory for each logical partition, and a starting address within the local memory for each logical partition may be obtained. This information may be packaged into an extended cross-memory descriptor 370-390 for each local memory of each logical partition. These extended cross-memory descriptors 370-390 are then maintained by the operating system 320 of the current logical partition 310 for use in performing remote memory copy and DMA operations to the other logical partitions 312-316.

Figure 4:
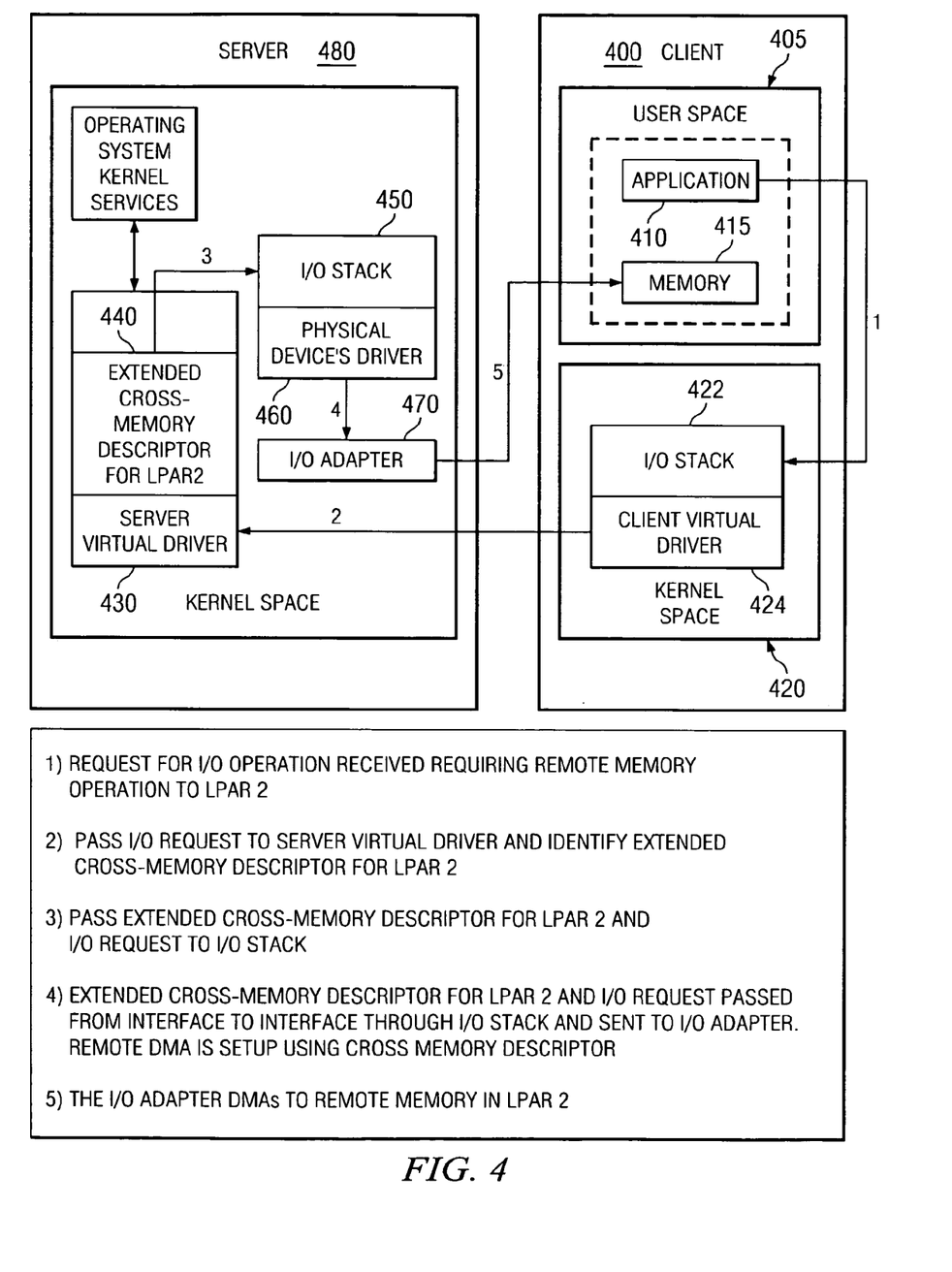
FIG. 4 is an exemplary diagram illustrating an example of a mechanism according to one exemplary embodiment of the present invention for using an extended cross-memory descriptor to perform an operation requiring remote memory access.

FIG. 4 is an exemplary diagram illustrating an example of a mechanism according to one exemplary embodiment of the present invention for using an extended cross-memory descriptor to perform an operation requiring remote memory access. As shown in FIG. 4, when a process, such as an application 410, of a client device 400 generates an input/output (I/O) request, e.g., via a read( ) system call, to the operating system kernel space 420 that requires a remote memory access operation to be performed, the I/O request is processed through the I/O stack 422 down to a client virtual device driver 424. The client virtual device driver 424 forwards the request to a server 480 counterpart, i.e. server virtual driver 430.

The server virtual driver 430, has already created an extended cross memory descriptor 440 for a remote partition of memory 415, e.g., a logical partition 2, at boot time. For example, the server virtual driver 430 may, at boot time, call the xmattach_remio kernel service of the present invention to generate an extended cross memory descriptor. The server virtual driver 430 passes the I/O request along with the extended cross-memory descriptor 440 down the I/O stack 450 on the server side. The I/O request finally gets passed down the I/O stack 450 to the physical device driver 460, e.g., a SCSI adapter driver, which schedules a DMA operation with its I/O adapter 470. When the DMA is completed by the I/O adapter 470, the data is written to the remote memory 415. Thus, as illustrated in the above example, in addition to the data itself, the only other necessary element that is required for the remote direct memory access to occur is the description of the remote memory that is provided through the extended cross-memory descriptor of the present invention.

Figure 5:
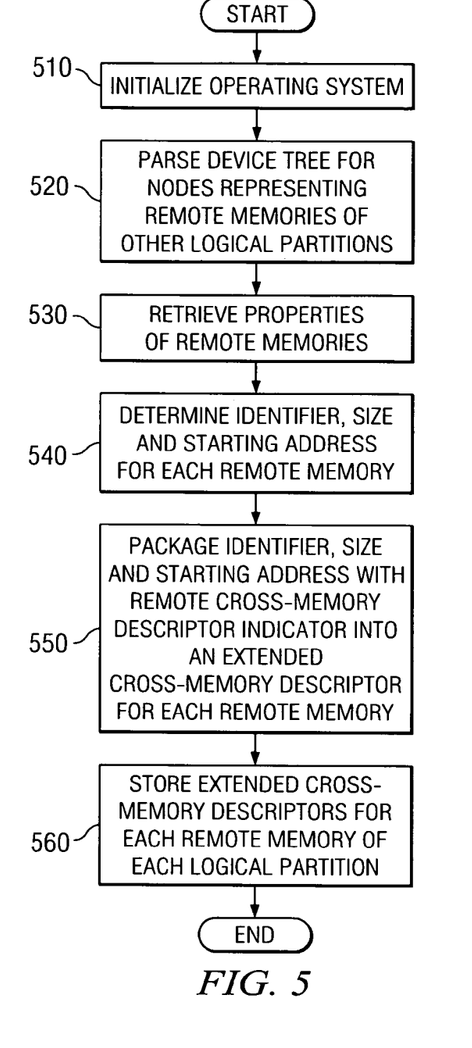
FIG. 5 is a flowchart outlining an exemplary process for generating an extended cross-memory descriptor in accordance with one exemplary embodiment of the present invention.
Figure 6:
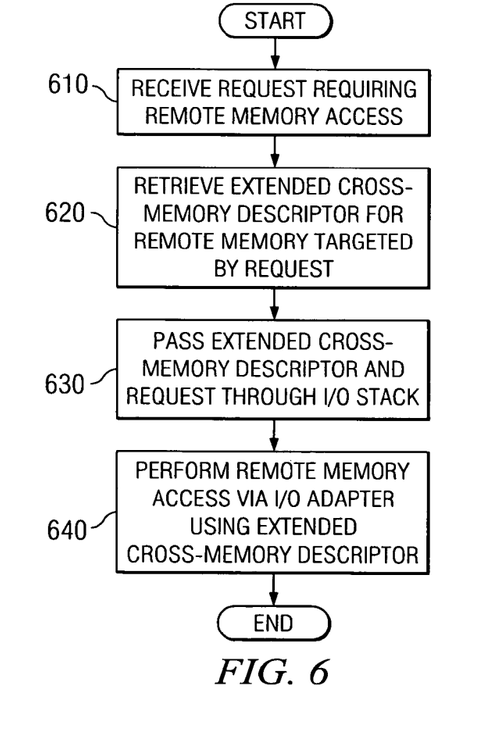
FIG. 6 is a flowchart outlining an exemplary process for using an extended cross-memory descriptor in accordance with one exemplary embodiment of the present invention.

FIGS. 5 and 6 are flowcharts that illustrate exemplary processes for generating and using an extended cross-memory descriptor according to exemplary embodiments of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 5 is a flowchart outlining an exemplary process for generating an extended cross-memory descriptor in accordance with one exemplary embodiment of the present invention. As shown in FIG. 5, the operation starts with an initialization of an operating system (step 510). The operating system kernel services then parse the device tree for the computer system looking for nodes representing remote memories of other logical partitions (step 520). The properties for these remote memory nodes are then retrieved (step 530) and used to determine an identifier, size and starting address for each remote memory of the other partitions (step 540). The identifier, size and starting address is then packaged with a remote identifier into an extended cross-memory descriptor for each remote memory of each of the other logical partitions (step 550). These extended cross-memory descriptors are then stored for later use in performing remote memory accesses (step 560).

FIG. 6 is a flowchart outlining an exemplary process for using an extended cross-memory descriptor in accordance with one exemplary embodiment of the present invention. As shown in FIG. 6, the operation starts by receiving a request requiring a remote memory access (step 610). The extended cross-memory descriptor for the remote memory targeted by the request is then retrieved (step 620). The extended cross-memory descriptor is then passed along with the request to the I/O stack (step 630) which processes the extended cross-memory descriptor and the request accordingly. The remote memory access is then performed via the I/O adapter using the extended cross-memory descriptor (step 640).

Thus, the present invention provides a mechanism for extending the known cross-memory descriptor so that it may describe a remote memory of a different partition from the partition in which a process is currently running. Because the extensions provided by the present invention use the same format as the known cross-memory descriptor, but have different data and connotations associated with the data, many of the interfaces and memory management services present in computing devices need not be modified to handle the extended cross-memory descriptor. Other interfaces and memory management services which examine the cross-memory descriptor may be augmented to include code for handling extended cross-memory descriptors so as to provide functionality for performing remote memory accesses.

Although the exemplary embodiments of the present invention have been described in the context of a typical DMA operation, the present invention is not limited to such. For example, the present invention may be use an extended cross-memory descriptor for remote copy operations as well. The copy operation may be facilitated by the hypervisor, or other hardware and/or software mechanism, where the server partition supplies information to the mechanism, e.g., the hypervisor, via a well documented interface between the operating system and the hypervisor. The information supplied comes from the extended cross-memory descriptor (e.g., the identifier that identifies a client partition's remote memory). The hypervisor then may perform the actual copy operation from the server to the client or from the client to the server.

The operation may be initiated by the server side and hence, the server may either pull the data (such as with the xmemin system call) or may push the data (such as with the xmemout system call) to the client partition. The hypervisor can perform the actual copy operation because it has a higher supervisory privilege than the operating systems running above it. This allows the hypervisor to access any memory of any partition. The remote copy operation of this nature facilitates design and implementation of more sophisticated data exchange protocols between the server and client.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for a first process in a first logical partition to access a remote memory in a second logical partition, comprising:

Retrieving an extended cross-memory descriptor for the remote memory, wherein the extended cross-memory descriptor provides a description of the remote memory, and wherein the extended cross-memory descriptor includes a first field designating the extended cross-memory descriptor as describing a remote memory in a different logical partition; and Accessing, for the first process in the first logical partition, the remote memory in the second logical partition based on the extended cross-memory descriptor.

2. The method of claim 1, wherein the extended cross-memory descriptor further includes a second field identifying the remote memory in the second logical partition, a third field designating a size of the remote memory, and a fourth field designating a starting address in the remote memory.

3. The method of claim 1, wherein the extended cross-memory descriptor is generated when an operating system in the first logical partition is initialized.

4. The method of claim 1, wherein the extended cross-memory descriptor is generated by an operating system kernel service that attaches remote memories of other logical partitions to the operating system of the first logical partition.

5. The method of claim 4, wherein the operating system kernel service generates the extended cross-memory descriptor based on a device tree for the second logical partition that is parsed by the operating system kernel service when the operating system in the first logical partition is initialized.

6. The method of claim 5, wherein the device tree is maintained by a hypervisor.

7. The method of claim 1, wherein the first logical partition is in a server computing device and the second logical partition is in a client computing device.

8. The method of claim 1, wherein accessing the remote memory in the second logical partition includes performing a direct memory access operation using the extended cross-memory descriptor.

9. The method of claim 1, wherein accessing the remote memory in the second logical partition based on the extended cross-memory descriptor includes:
  passing the extended cross-memory descriptor down an input/output (I/O) stack to a physical device driver;
  generating a direct memory access operation based on the extended cross-memory descriptor; and
  submitting the direct memory access operation to an I/O adapter, wherein the I/O adapter transmits the direct memory access operation to the second logical partition.

10. A computer program product in a recordable-type media for a first process in a first logical partition to access a remote memory in a second logical partition, comprising:
  first instructions for retrieving an extended cross-memory descriptor for the remote memory, wherein the extended cross-memory descriptor provides a description of the remote memory, wherein the extended cross-memory descriptor includes a first field designating the extended cross-memory descriptor as describing a remote memory in a different logical partition; and
  second instructions for accessing, for the first process in the first logical partition, the remote memory in the second logical partition based on the extended cross-memory descriptor.

11. The computer program product of claim 10, wherein the extended cross-memory descriptor further includes a second field identifying the remote memory in the second logical partition, a third field designating a size of the remote memory, and a fourth field designating a starting address in the remote memory.

12. The computer program product of claim 10, wherein the extended cross-memory descriptor is generated when an operating system in the first logical partition is initialized.

13. The computer program product of claim 10, wherein the extended cross-memory descriptor is generated by an operating system kernel service that attaches remote memories of other logical partitions to the operating system of the first logical partition.

14. The computer program product of claim 13, wherein the operating system kernel service generates the extended cross-memory descriptor based on a device tree for the second logical partition that is parsed by the operating system kernel service when the operating system in the first logical partition is initialized.

15. The computer program product of claim 14, wherein the device tree is maintained by a hypervisor.

16. The computer program product of claim 10, wherein the second instructions for accessing the remote memory in the second logical partition include instructions for performing a direct memory access operation using the extended cross-memory descriptor.

17. The computer program product of claim 10, wherein the second instructions for accessing the remote memory in the second logical partition based on the extended cross-memory descriptor include:
  instructions for passing the extended cross-memory descriptor down an input/output (I/O) stack to a physical device driver;
  instructions for generating a direct memory access operation based on the extended cross-memory descriptor; and
  instructions for submitting the direct memory access operation to an I/O adapter, wherein the I/O adapter transmits the direct memory access operation to the second logical partition.

* * * * *